(12) United States Patent
Koshimae et al.

(10) Patent No.: US 9,442,480 B2
(45) Date of Patent: Sep. 13, 2016

(54) LASER OUTPUT CONTROL DEVICE, LASER OSCILLATOR, AND LASER OUTPUT CONTROL METHOD

(71) Applicant: MITSUBISHI ELECTRIC CORPORATION, Chiyoda-ku, Tokyo (JP)

(72) Inventors: Toshiki Koshimae, Tokyo (JP); Teruaki Fukuoka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 292 days.

(21) Appl. No.: 14/238,326

(22) PCT Filed: Apr. 15, 2013

(86) PCT No.: PCT/JP2013/061222
§ 371 (c)(1),
(2) Date: Feb. 11, 2014

(87) PCT Pub. No.: WO2014/002583
PCT Pub. Date: Jan. 3, 2014

(65) Prior Publication Data
US 2014/0195035 A1    Jul. 10, 2014

(30) Foreign Application Priority Data
Jun. 26, 2012  (JP) .................. 2012-143063

(51) Int. Cl.
*G05B 19/18* (2006.01)
*B23K 37/02* (2006.01)
(Continued)

(52) U.S. Cl.
CPC ............. *G05B 19/182* (2013.01); *B23K 26/03* (2013.01); *B23K 26/0622* (2015.10);
(Continued)

(58) Field of Classification Search
CPC  G05B 19/182; B23K 26/0622; B23K 26/03; B23K 26/0869; B23K 26/083; B23K 37/0235; H01S 3/1312; H01S 3/1306; H01S 3/10046; H01S 3/1024; H01S 3/10069
See application file for complete search history.

(56) References Cited

U.S. PATENT DOCUMENTS 5,450,428 A * 9/1995 Maeda .................. H01S 5/0683
372/20
5,517,420 A * 5/1996 Kinsman ................ B23K 26/03
219/121.6

(Continued)

FOREIGN PATENT DOCUMENTS

JP      2-80062 A     3/1990
JP      2-271849 A    11/1990

(Continued)

OTHER PUBLICATIONS

Communication dated Jul. 9, 2015 from the European Patent Office in counterpart application No. 13809014.7.

(Continued)

*Primary Examiner* — Ramesh Patel
(74) *Attorney, Agent, or Firm* — Sughrue Mion, PLLC (57) ABSTRACT

A laser output control device controlling a laser oscillator includes: a switching section that switches, based on the basis of the size of a pulse width of a laser output command, a current command value used for controlling output of the laser light to either one of peak value control and average value control; a peak value command generating section generating a current command value for performing peak value control; and an average value command generating section generating a current command value for performing average value control; wherein an output value of the laser light measured by one measuring section is input to the peak value command generating section and the average value command generating section, and the current command value is generated such that the output value of the laser light becomes a value that corresponds to the laser output command.

6 Claims, 8 Drawing Sheets (51) Int. Cl.
  *B23K 26/03* (2006.01)
  *B23K 26/08* (2014.01)
  *H01S 3/13* (2006.01)
  *H01S 3/131* (2006.01)
  *H01S 3/10* (2006.01)
  *H01S 3/102* (2006.01)

(52) U.S. Cl.
  CPC ........ *B23K 26/083* (2013.01); *B23K 26/0869* (2013.01); *B23K 37/0235* (2013.01); *H01S 3/1306* (2013.01); *H01S 3/1312* (2013.01); *H01S 3/1024* (2013.01); *H01S 3/10046* (2013.01); *H01S 3/10069* (2013.01)

(56) References Cited

U.S. PATENT DOCUMENTS

| | | | | |
|---|---|---|---|---|
| 5,796,483 | A * | 8/1998 | Nakayama | G06F 9/70 250/548 |
| 5,905,695 | A * | 5/1999 | Kimura | G11B 7/0062 369/116 |
| 5,978,091 | A * | 11/1999 | Jann | G01B 11/02 356/426 |
| 5,982,790 | A * | 11/1999 | Grossman | H01S 3/13 372/10 |
| 6,038,241 | A * | 3/2000 | von Elm | H01S 3/117 372/10 |
| 6,078,601 | A | 6/2000 | Smith | |
| 6,246,659 | B1 * | 6/2001 | Suzuki | G11B 7/126 369/116 |
| 6,818,856 | B2 | 11/2004 | Yamazaki et al. | |
| 7,095,764 | B2 * | 8/2006 | Sato | H01S 5/062 372/38.02 |
| 2006/0007971 | A1 * | 1/2006 | Sato | H01S 5/062 372/38.02 |
| 2006/0198402 | A1 * | 9/2006 | Hodgson | B23K 26/0622 372/22 |
| 2011/0147566 | A1 * | 6/2011 | Furuya | G02F 1/37 250/205 |

FOREIGN PATENT DOCUMENTS

| | | |
|---|---|---|
| JP | 10-76379 A | 3/1998 |
| JP | 2004-25204 A | 1/2004 |
| JP | 2005-37267 A | 2/2005 |
| JP | 2010-10274 A | 1/2010 |

OTHER PUBLICATIONS

Communication dated Feb. 29, 2016, issued by the European Patent Office in corresponding European Application No. 13 809 014.7.

* cited by examiner

LASER OUTPUT CONTROL DEVICE, LASER OSCILLATOR, AND LASER OUTPUT CONTROL METHOD

CROSS REFERENCE TO RELATED APPLICATIONS

This application is a National Stage of International Application No. PCT/JP2013/061222 filed Apr. 15, 2013, claiming priority based on Japanese Patent Application No. 2012-143063 filed Jun. 26, 2012, the contents of all of which are incorporated herein by reference in their entirety.

FIELD

The present invention relates to a laser output control device, a laser oscillator, and a laser output control method for controlling the output of a laser light.

BACKGROUND

Laser machining tools that laser machine workpieces include a laser oscillator for outputting laser light, and a laser output control device for controlling the laser oscillator. When controlling the laser output, conventional laser output control devices detect the laser peak output with a power sensor capable of detecting the laser output at a high speed (a high-speed power sensor that follows high frequencies) and perform a peak value control or an average value control.

The use of high-speed power sensors leads to causing the devices to become expensive, and additionally leads to a complicated control because of increased instability due to factors of disturbance such as noise. Also, when performing average value control using high-speed power sensors, the time constant of the sensors has to be extended to accommodate low frequencies. An extension of the time constant of the sensors has led to the need for larger capacitances, such as that of the capacitors for delay circuit filters, and has thus caused devices to become expensive.

The laser machining tool disclosed in Patent Literature 1 compensates for delays in the amplifier as follows. Measured values that are output from the amplifier are estimated sequentially, and on the basis of the measured laser output value by the amplifier, the laser output command value and the response characteristics of the amplifier, laser output command values are feedback-compensated in accordance with the difference between the laser output command values and the simulated values that are generated by a measured value simulation means, and thus there is compensation for response delays in power sensors.

CITATION LIST

Patent Literature

Patent Literature 1: Japanese Patent Application Laid-open No. 2004-25204

SUMMARY

Technical Problem

However, the use of simulated values made to conform to the response characteristics of the amplifier and the need for prediction of a measured laser output value that conforms to the response characteristics of the amplifier in the above-mentioned conventional technique have led to problems such as the high cost of the device as well as a complex device configuration.

The present invention is made in view of the above and it is an object of the present invention to obtain a laser output control device, a laser oscillator, and a laser output control method for controlling the output of a laser light using a simple configuration and with ease.

Solution to Problem

In order to solve the aforementioned problems, a laser output control device controlling a laser oscillator that outputs a laser light according to one aspect of the present invention is configured to include: a pulse-width calculating section calculating a pulse width during which the laser light is laser-oscillating on the basis of a laser output command used when generating an output waveform of the laser light; a switching section switching, on the basis of the size of the pulse width, a control method to either one of peak value control, in which control is performed using a peak value of a pulse shape, and average value control, in which control is performed using an average value of a pulse shape, for calculating a current command value used for controlling the laser oscillator; a peak value command generating section generating, on the basis of an output value of the laser light output from the laser oscillator, a current command value using the peak value of the pulse shape such that the output value becomes a value that corresponds to the laser output command, when performing the peak value control on the laser oscillator; and an average value command generating section generating, on the basis of an output value of the laser light output from the laser oscillator, a current command value using the average value of the pulse shape such that the output value becomes a value that corresponds to the laser output command when performing the average value control on the laser oscillator, wherein the output value of the laser light measured by one measuring section is input to the peak value command generating section and the average value command generating section.

Advantageous Effects of Invention

The advantageous effect conferred by the present invention is that the present invention allows the output of a laser light to be controlled using a simple configuration and with ease.

BRIEF DESCRIPTION OF DRAWINGS

FIG. 5-1 depicts a monitored output value when peak value control is performed.

FIG. 5-2 depicts a monitored output value when average value control is performed.

FIG. 7-1 depicts a relationship between an average output command value and a peak output value.

FIG. 7-2 depicts output command pulse shapes that are generated using the peak output value and output timing.

FIG. 7-3 depicts current command pulse shapes that are output to a laser power source when peak value control is performed.

FIG. 8-1 depicts the average output command value that is used in average value control.

FIG. 8-2 depicts a relationship between a current command value and the average output command value after feedback control.

FIG. 8-3 depicts current command pulse shapes that are output to the laser power source when average value control is performed.

DESCRIPTION OF EMBODIMENTS

A laser output control device, a laser oscillator, and a laser output control method according to an embodiment of the present invention are described in detail with reference to the accompanying drawings. The present invention is not limited to this embodiment.

Embodiment

Figure 1:
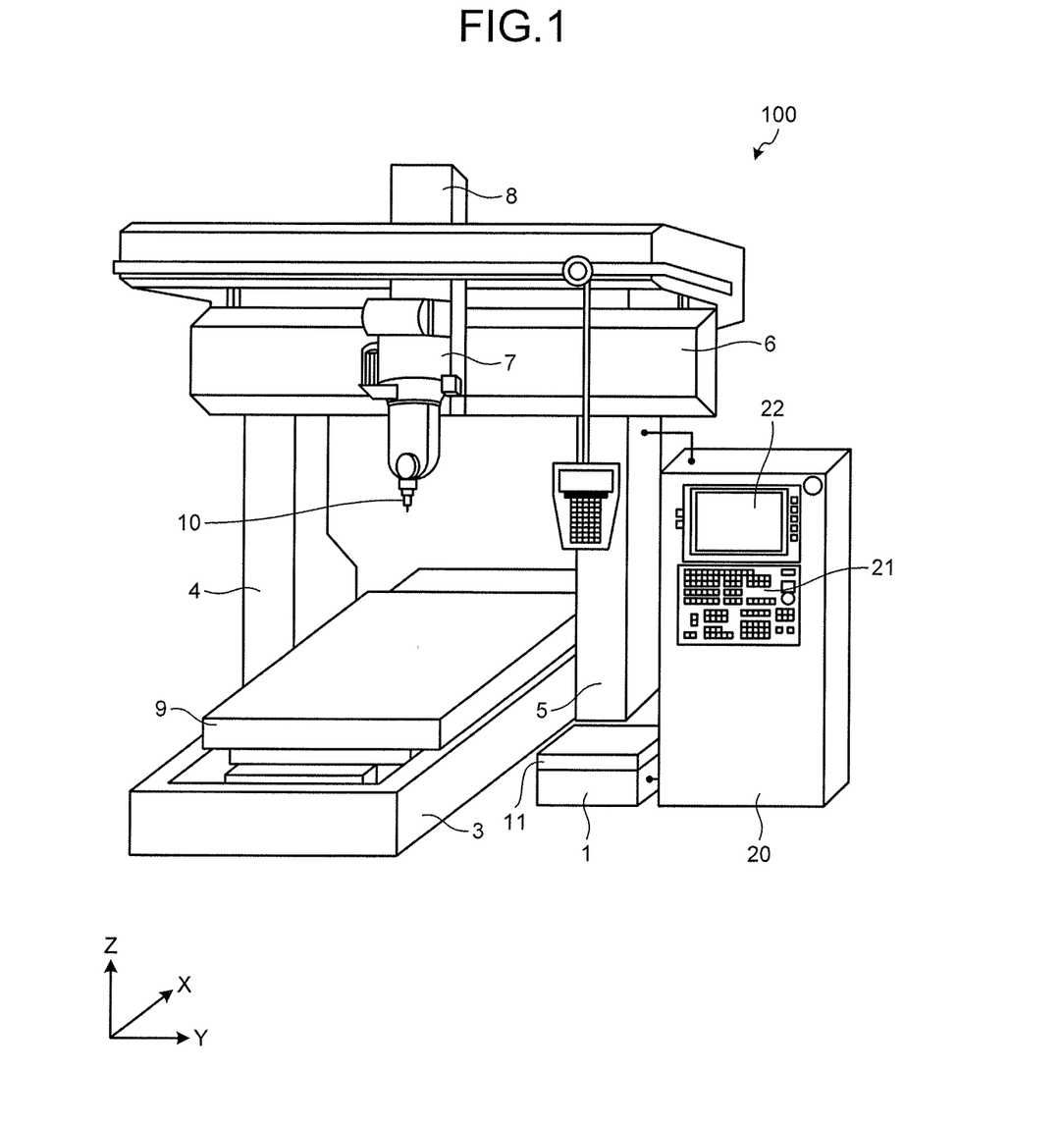
FIG. 1 depicts a configuration of a laser machining tool which includes a laser output control device according to an embodiment.

FIG. 1 depicts a configuration of a laser machining tool that includes a laser output control device according to an embodiment. A laser machining tool 100 includes a laser oscillator 1, a laser output control device (feedback control device) 11, a machining table 9, left and right columns 4 and 5, a cross rail 6, a Y-axis unit 7, a Z-axis unit 8, a machining head 10, and a machining control device 20.

The machining table 9 is provided on a bed 3 so that the machining table 9 is movable in the X-Y plane. The work material (the workpiece) that is to be laser machined is placed on the machining table 9. The cross rail 6 is provided horizontally across the left and right columns 4 and 5. The Y-axis unit 7 is provided on the cross rail 6 so that the Y-axis unit 7 is movable in the Y-axis direction. The Z-axis unit 8 is provided on the Y-axis unit 7 so that the Z-axis unit 8 is movable in the Z-axis direction. The machining head 10 is mounted on the Z-axis unit 8. A machining nozzle (a laser nozzle) is mounted on the tip of the machining head 10.

The machining control device 20 is a man-machine interface, and is equipped with an operating panel 21 and a screen display unit 22. The screen display unit 22 is, for example, a liquid crystal panel. The machining control device 20 controls the positions of the machining table 9, the Y-axis unit 7, and the Z-axis unit 8 according to the axis commands given to each of an X-axis servomotor, a Y-axis servomotor, and a Z-axis servomotor, which are not shown.

The machining control device 20 also includes a laser output command section 2, which will be mentioned later. The laser output command section 2 transmits a command for outputting a laser light (a laser output command value) to the laser output control device 11 in accordance with a machining program.

The laser output control device 11 is a device that controls the laser oscillator 1, and it is connected to the laser oscillator 1. The laser output control device 11 of the present embodiment causes the laser oscillator 1 to output a laser light, while switching the laser oscillator 1 to either average value output (average value control) or peak value output (peak value control), on the basis of an ON pulse width W calculated from the laser output command value. The ON pulse width W is the time during which the laser is oscillating and is the ON time of a pulse. The average value control is a control where the laser output command value that is output to the laser oscillator 1 is an average value of a pulse shape, and the peak value control is a control where the laser output command value that is output to the laser oscillator 1 is a peak value of a pulse shape.

Figure 2:
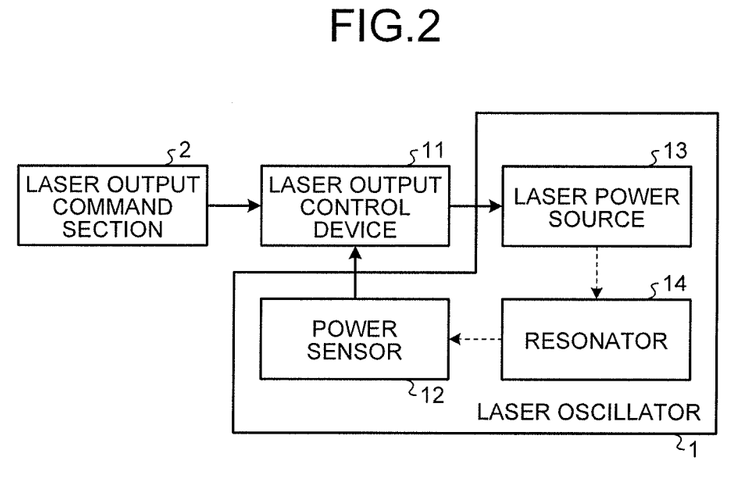
FIG. 2 is a block diagram depicting a configuration of a laser oscillator.

FIG. 2 is a block diagram depicting a configuration of the laser oscillator. The laser oscillator 1 is connected to the laser output control device 11, and it includes a laser power source 13, a power sensor (a measuring section) 12, and a resonator 14.

The laser output control device 11 is connected to the laser output command section 2 of the machining control device 20, and it receives the laser output command value from the laser output command section 2. In addition, the laser output control device 11 is connected to the power sensor 12 and the laser power source 13. The laser output control device 11 receives the monitored output value of the laser power from the power sensor 12.

The laser output control device 11 feedback-controls the laser power source 13 on the basis of the laser output command value and the monitored output value. The laser output control device 11 calculates the ON pulse width W of the laser light on the basis of the laser output command value, and performs switching to either the average value output or the peak value output in accordance with the ON pulse width W. The laser output control device 11 performs average value control on the laser light when the ON pulse width W is equal to or less than a predetermined value, and performs the peak value control on the laser light when the ON pulse width W is greater than the predetermined value. The laser output control device 11 controls the output value of the laser light that is output from the resonator 14 by controlling the laser power source 13.

The laser power source 13 generates a current, on the basis of a current command (a pulse shape) that is transmitted from the laser output control device 11, and, in this way, it outputs, to the resonator 14, a laser light in accordance with the current command. The resonator 14 outputs a laser light in accordance with the current that is transmitted from the laser power source 13.

The power sensor 12 monitors the power (the output value) of the laser light that is output from the resonator 14 and transmits the output value to the laser output control device 11. The laser output control device 11 of the present embodiment performs peak value control and average value control using output values of the laser light that are measured by the same power sensor 12. Hence, the output values of the laser lights measured by the same power sensor 12 are input to the laser output control device 11 regardless of whether peak value control or average value control is performed.

Figure 3:
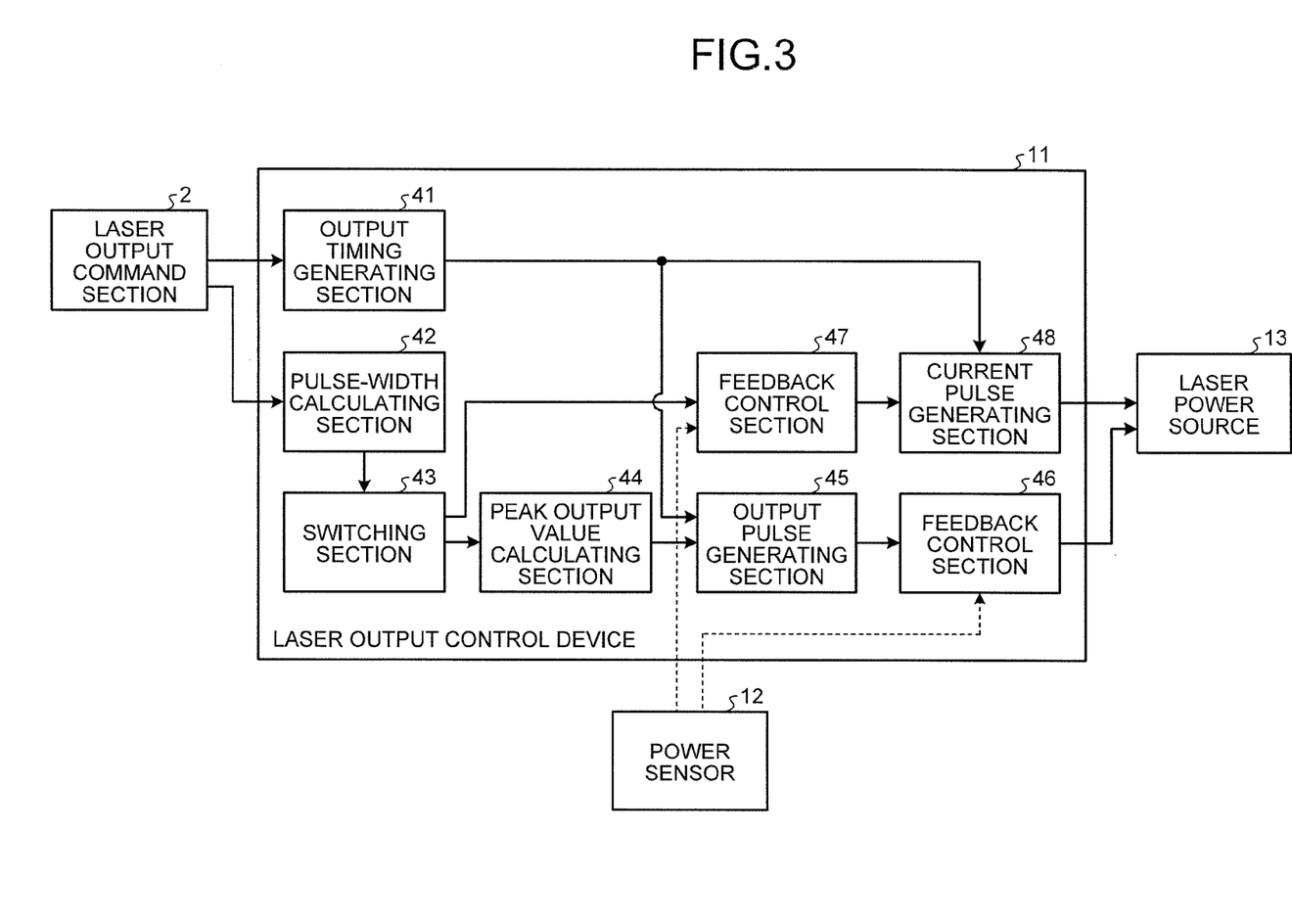
FIG. 3 is a block diagram depicting a configuration of the laser output control device according to the embodiment.

FIG. 3 is a block diagram depicting a configuration of the laser output control device according to the embodiment. The laser output control device 11 includes an output timing generating section 41, a pulse-width calculating section 42, a switching section 43, a peak output value calculating section 44, an output pulse generating section 45, a feedback control section 46, a feedback control section 47, and a current pulse generating section 48.

The peak output value calculating section 44, the output pulse generating section 45, and the feedback control section 46 disclosed herein correspond to the peak value command generating section recited in the claims. Also, the feedback control section 47 and the current pulse generating section 48 disclosed herein correspond to the average value command generating section recited in the claims.

The output timing generating section 41 and the pulse-width calculating section 42 are each connected to the laser output command section 2. For example, a frequency f and a duty D are transmitted to the output timing generating section 41 as a laser output command value. The output timing generating section 41 generates an output timing (the on/off timing) Ow1 using the frequency f and the duty D. The output timing generating section 41 transmits the output timing Ow1 to the output pulse generating section 45 and the current pulse generating section 48. The output timing generating section 41 may transmit the output timing Ow1 to the output pulse generating section 45 when performing peak value control, and it may transmit the output timing Ow1 to the current pulse generating section 48 when performing average value control.

For example, an average output command value Px, the frequency f, and the duty D are transmitted to the pulse-width calculating section 42 as the laser output command value. duty D=pulse ON-time/1 cycle. The pulse-width calculating section 42 calculates the ON pulse width W using the frequency f and the duty D. The pulse-width calculating section 42 transmits the ON pulse width W to the switching section 43.

The switching section 43 determines whether or not the ON pulse width W is greater than a predetermined value T. In other words, whether or not the time period of the ON pulse width W is longer than T is determined. The switching section 43 transmits the average output command value Px and the duty D to the peak output value calculating section 44 when the ON pulse width W is greater than T. The switching section 43 transmits the average output command value Px to the feedback control section 47 when the ON pulse width W is equal to or less than T.

The peak output value calculating section 44 calculates a peak output value P1 (a command value) by dividing the average output command value Px by the duty D when performing a peak value control. The peak output value calculating section 44 transmits the calculated peak output value P1 to the output pulse generating section 45.

The output pulse generating section 45 generates an output command pulse shape Ow2 by performing an AND operation on the peak output value P1 and the output timing Ow1. The output pulse generating section 45 transmits the generated output command pulse shape Ow2 to the feedback control section 46.

The feedback control section 46 reads a monitored output value M1 of the laser light, which has been measured by the power sensor 12. The feedback control section 46 adjusts a current command value (the output command pulse shape Ow2) so that the monitored output value M1 becomes a value that corresponds to the peak output command value P1, and then it generates a current command value Ow3. The feedback control section 46 generates a current command pulse shape (an output command pulse shape) Ow4 for the laser power source 13 using the current command value Ow3. The feedback control section 46 outputs, to the laser power source 13, the current command pulse shape Ow4 as a current command.

The feedback control section 47 reads a monitored output value M2 of the laser light which has been measured by the power sensor 12 when performing the average value control. The feedback control section 47 calculates an average monitored output value M3 by performing an averaging procedure on the monitored output value M2. The feedback control section 47 adjusts a current command value (the average output command value Px) so that the average monitored output value M3 becomes a value that corresponds to the average output command value Px), and then it generates a current command value P5. The feedback control section 47 transmits the generated current command value P5 to the current pulse generating section 48.

The current pulse generating section 48 generates a current command pulse shape (an output command pulse shape) Ow5 by performing an AND operation on the current command value P5 and the output timing Ow1. The current pulse generating section 48 then outputs, to the laser power source 13, the current command pulse shape Ow5 as a current command.

Figure 4:
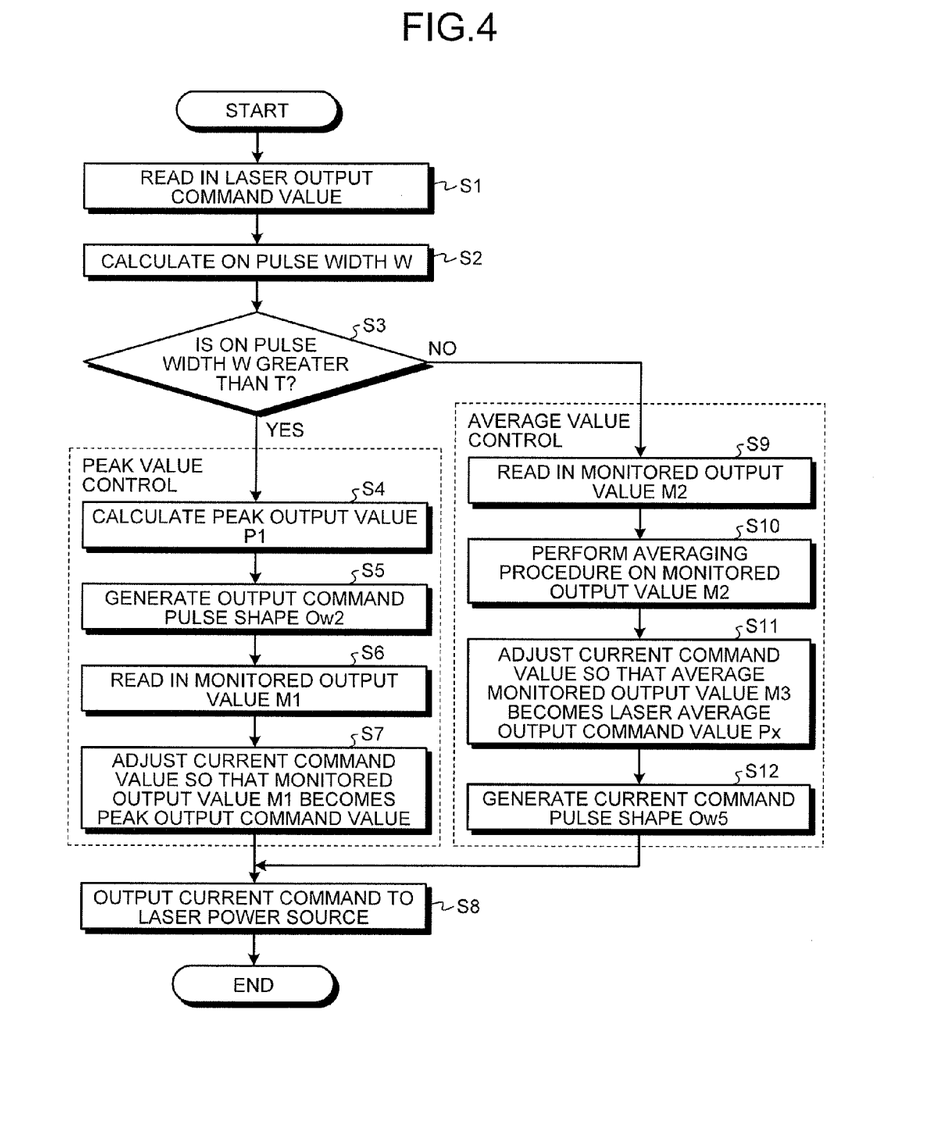
FIG. 4 is a flowchart of the steps involved in controlling the output of a laser light.

FIG. 4 is a flowchart of the steps involved in controlling the output of the laser light. The laser output control device 11 receives and reads the laser output command value that is transmitted from the laser output command section 2 (step S1). For example, the average output command value Px, the frequency f, and the duty D are transmitted to the laser output control device 11 as the laser output command value.

The pulse-width calculating section 42 calculates the pulse width using the frequency f and the duty D. The pulse-width calculating section 42 disclosed herein calculates the ON pulse width W among pulse widths (step S2). In addition, the switching section 43 determines whether or not the ON pulse width W is greater than the predetermined value T (step S3).

The predetermined value T is a value that is set in advance, based on the characteristics of the power sensor 12 (for example, the averaging time (the filter time constant)). If the predetermined value T is set too low, peak value control will be performed on high-frequency pulse waves in which the output value of the laser light does not reach the peak value. The predetermined value T is therefore set to a value where the peak value of the output value of the laser light can be detected by the power sensor 12 when performing peak value control. For example, when pulsing the laser light, the predetermined value T is set so that $t1 \leq T$, when t1 is the time from which the pulsing starts to when the pulse reaches its peak value.

When the ON pulse width W is greater than T (step S3, Yes), the laser output control device 11 performs peak value control. Specifically, when the ON pulse width W is greater than T, the switching section 43 transmits the average output command value Px and the duty D to the peak output value calculating section 44. The peak output value calculating section 44 calculates the peak output value P1 (the command value) by dividing the average output command value Px by the duty D (step S4).

Also, the output timing generating section 41 generates the output timing (on/off timing) Ow1 using the frequency f and the duty D. Further, the output pulse generating section 45 generates the output command pulse shape Ow2 by performing the AND operation on the peak output value P1 and the output timing Ow1 (step S5).

The feedback control section 46 reads the monitored output value M1 of the laser light, which has been measured by the power sensor 12 (step S6). Furthermore, the feedback control section 46 adjusts the current command value (in this case, the output command pulse shape Ow2) so that the monitored output value M1 becomes the peak output command value (step S7).

In other words, the feedback control section 46 performs feedback control (a PID operation) by calculating the difference between the generated output command pulse shape Ow2 and the monitored output value M1 and then by generating the current command value Ow3 that allows the difference to become 0. The feedback control section 46 thus adjusts the current command value on the basis of the monitored output value M1 such that the current command value becomes a desired peak output command value.

The feedback control section 46 then generates the current command pulse shape Ow4 for the laser power source 13 using the current command value Ow3. Next, the feedback control section 46 outputs, to the laser power source 13, the current command pulse shape Ow4 as the current command (step S8).

In contrast, when the ON pulse width W is equal to or less than T (step S3, No), the laser output control device 11 performs average value control. Specifically, when the ON pulse width W is equal to or less than T, the switching section 43 transmits the average output command value Px to the feedback control section 47. The feedback control section 47 reads the monitored output value M2 of the laser light, which has been measured by the power sensor 12 (step S9). Then, the feedback control section 47 calculates the average monitored output value M3 by performing an averaging procedure on the monitored output value M2 (step S10).

The feedback control section 47 adjusts the current command value so that the average monitored output value M3 becomes the value that corresponds to the average output command value Px (for example, the same value) (step S11), and it then generates the current command value P5. In other words, the feedback control section 47 performs feedback control (the PID operation) on the output of the laser light by using the average monitored output value M3.

Thereafter, the current pulse generating section 48 generates the current command pulse shape (the current command) Ow5 by using the adjusted current command value P5 (step S12). At this time, the current pulse generating section 48 generates the current command pulse shape Ow5 by performing an AND operation on the current command value P5 and the output timing Ow1. The current pulse generating section 48 outputs, to the laser power source 13, the current command pulse shape Ow5 as the current command (step S8). When the command for outputting the laser light is a continuous wave, the switching section 43 determines that the ON pulse width W is greater than the predetermined value T, and the laser output control device 11 performs peak value control.

Figure 51:
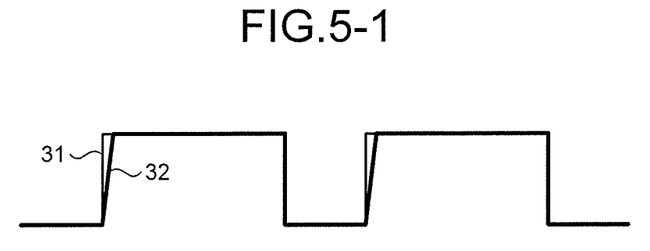
Figure 52:
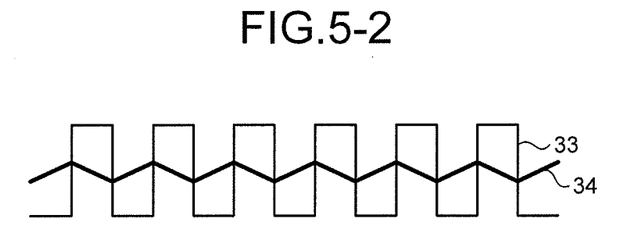

FIG. 5-1 depicts the monitored output value when peak value control is performed, and FIG. 5-2 depicts the monitored output value when average value control is performed. A waveform 31 in FIG. 5-1 is an actual laser output waveform when a pulse wave is of a low frequency, and it corresponds to the current command pulse shape Ow4. In contrast, a waveform 32 corresponds to the monitored output value M1 when a pulse wave is of a low frequency.

In addition, a waveform 33 in FIG. 5-2 is an actual laser output waveform when a pulse wave is of a high frequency, and it corresponds to the current command pulse shape Ow5. Additionally, a waveform 34 corresponds to the average monitored output value M3 when a pulse wave is of a high frequency.

When the ON pulse width W is greater than the predetermined value T, the laser output control device 11 performs peak value control. Thus, when the ON pulse width W is greater than the predetermined value T, the output of the laser light is controlled so that the waveform 32 (the monitored output value M1) follows the waveform 31 which is a pulse shape. Hence, the monitored output value M1 and the actual laser output waveform substantially match.

In contrast, when the ON pulse width W is equal to or less than the predetermined value T, the laser output control device 11 performs average value control. Thus, when the ON pulse width W is equal to or less than the predetermined value T, the output of the laser light is controlled so that the waveform 34 (the average monitored output value M3) follows the average value output of the waveform 33. Hence, the average monitored output value M3 and the laser output waveform that corresponds to the average output command value Px substantially coincide with each other.

Figure 6:
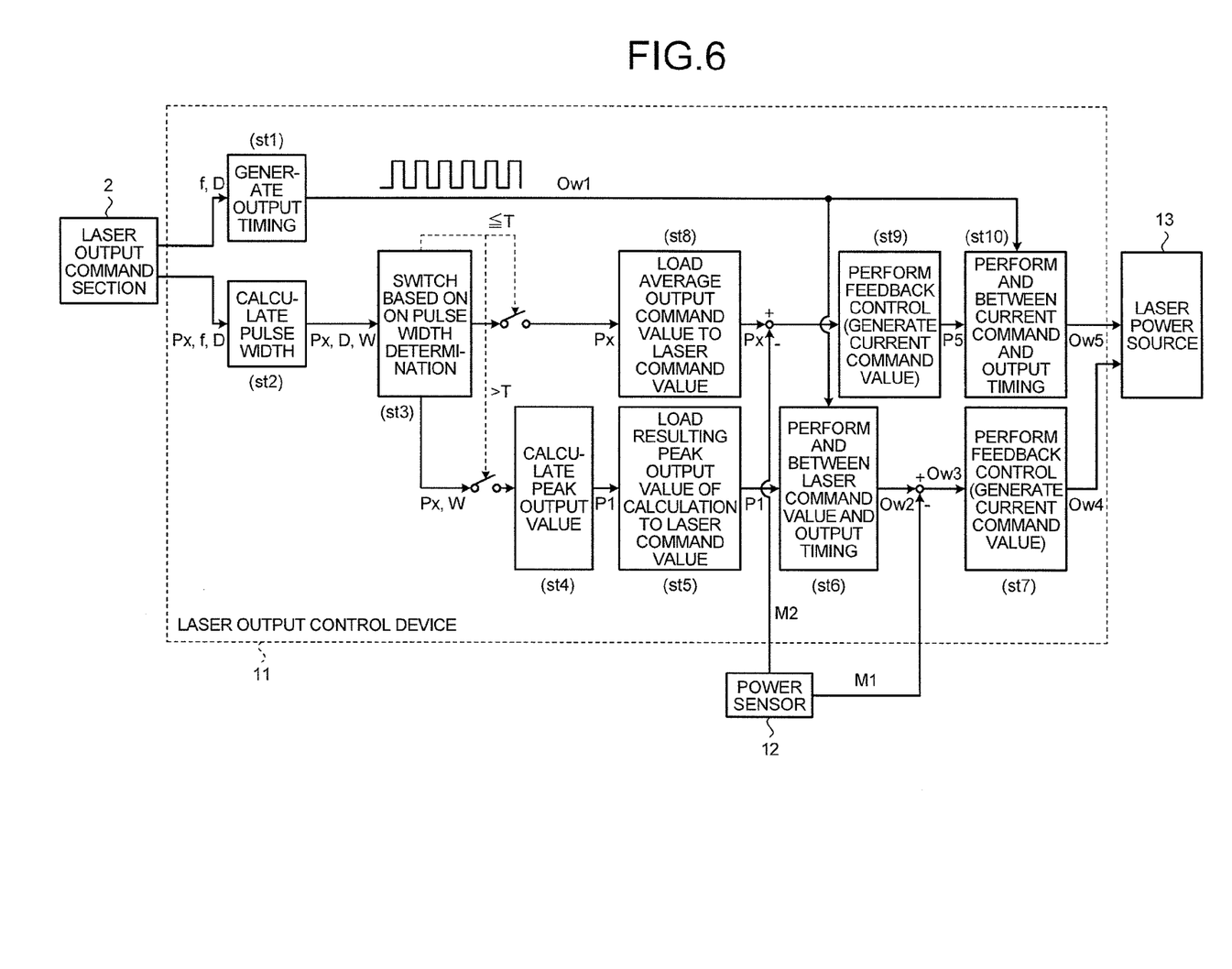
FIG. 6 depicts the procedures involved in the operation of the laser output control device according to the embodiment.

Next, the procedures involved in the operation of the laser output control device 11 according to the present embodiment will be described. FIG. 6 depicts the procedures involved in the operation of the laser output control device according to the embodiment. The laser output control device 11 receives the laser output command value transmitted from the laser output command section 2. Specifically, the output timing generating section 41 receives the frequency f and the duty D as the laser output command value, and the pulse-width calculating section 42 receives the average output command value Px, the frequency f, and the duty D as the laser output command value.

The output timing generating section 41 thus generates the output timing Ow1 using the frequency f and the duty D (st1). Further, the pulse-width calculating section 42 calculates the ON pulse width W using the frequency f and the duty D (st2). The pulse-width calculating section 42 at this time calculates the ON pulse width W using equation (1) as follows.

$$W = (1/f) \times D \quad (1)$$

The switching section 43 performs switching between average value control and peak value control, on the basis of the length of the ON pulse width W (st3). When the ON pulse width W is greater than T, the laser output control device 11 performs the peak value control. In this case, the peak output value calculating section 44 calculates the peak output value P1 using equation (2) (st4).

$$P1 = Px/D \quad (2)$$

Next, the output pulse generating section 45 loads the calculated peak output value P1 (the resulting peak output value of the calculation) for the laser command value (st5). The output pulse generating section 45 generates the output command pulse shape Ow2 by performing an AND operation on the laser command value (the peak output value P1) and the output timing Ow1 (st6).

The feedback control section 46 performs the feedback control using the monitored output value M1 of the laser light, which has been measured by the power sensor 12. Specifically, the feedback control section 46 adjusts the current command value Ow3 so that the monitored output value M1 becomes the peak output command value (st7). Furthermore, the feedback control section 46 generates the current command pulse shape Ow4 for the laser power source 13 using the adjusted current command value Ow3 and outputs it to the laser power source 13.

In contrast, when the ON pulse width W is equal to or less than T, the laser output control device 11 performs the average value control. In this case, the feedback control section 47 loads the average output command value Px (the command value) for the laser command value (st8). Also, the feedback control section 47 calculates the average monitored output value M3 by performing an averaging procedure on the monitored output value M2 of the laser light, which has been measured by the power sensor 12.

Next, the feedback control section 47 performs feedback control using the average monitored output value M3. Specifically, the feedback control section 47 generates the current command value P5 so that the average monitored output value M3 becomes the same value as the average output command value Px (st9).

The current pulse generating section 48 then generates the current command pulse shape Ow5 by performing an AND operation on the current command value P5 and the output timing Ow1 (st10). Next, the current pulse generating section 48 outputs the current command pulse shape Ow5 to the laser power source 13.

Figure 71:
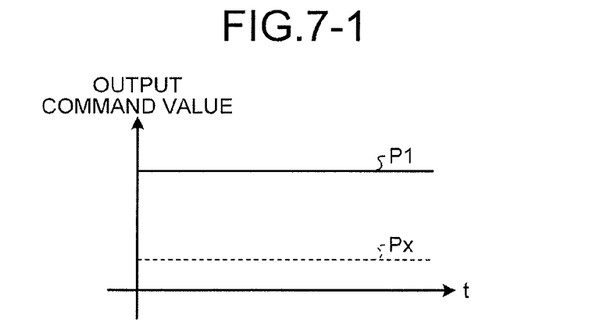
Figure 72:
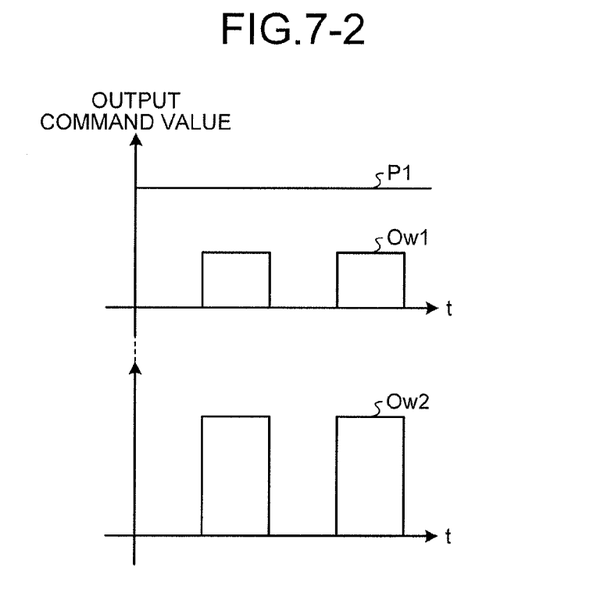
Figure 73:
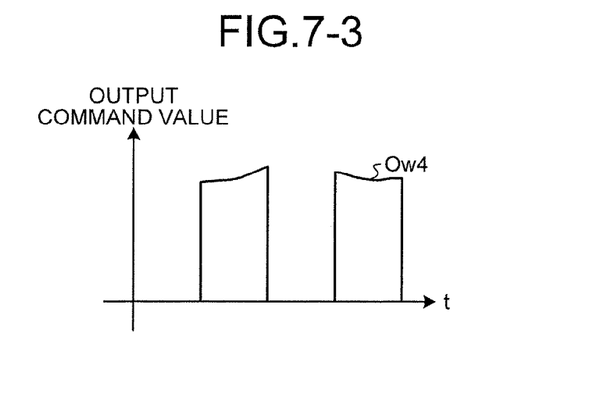

FIG. 7-1 to FIG. 7-3 depict the laser light output command values that are used when peak value control is performed. FIG. 7-1 depicts a relationship between the average output command value and the peak output value. The peak output value shown in FIG. 7-1 is the peak output value P1 that is loaded for the laser command value when peak value control is performed, and it is the waveform at a time when the laser output control device 11 performs the procedure at sty. For example, when the duty D is 25%, a value four times (=1/0.25) the average output command value Px becomes the peak output value P1.

FIG. 7-2 depicts the output command pulse shape that is generated using the peak output value and the output timing. The laser output control device 11 generates the output command pulse shape Ow2 by performing an AND operation on the peak output value P1 and the output timing Ow1. The output command pulse shape Ow2 shown in FIG. 7-2 is therefore a waveform at a time when the laser output control device 11 performs the procedure at st6.

FIG. 7-3 depicts the current command pulse shape that is output to the laser power source when peak value control is performed. The current command pulse shape shown in FIG. 7-3 is the current command pulse shape Ow4 that the laser output control device 11 outputs to the laser power source 13, and is the waveform when the laser output control device 11 performs the procedure at st7. The current command pulse shape Ow4 is output to the laser power source 13 by the laser output control device 11.

Figure 81:
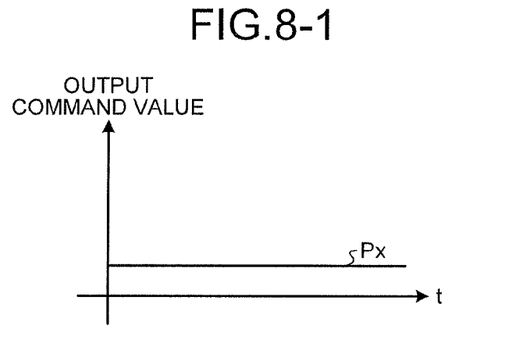
Figure 82:
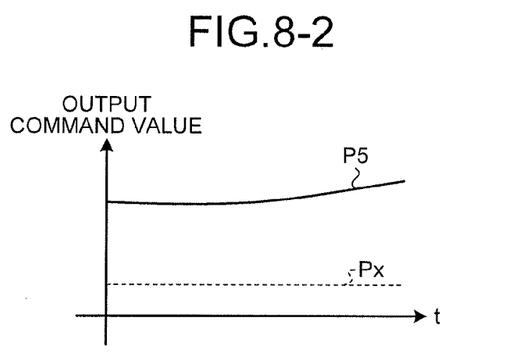
Figure 83:
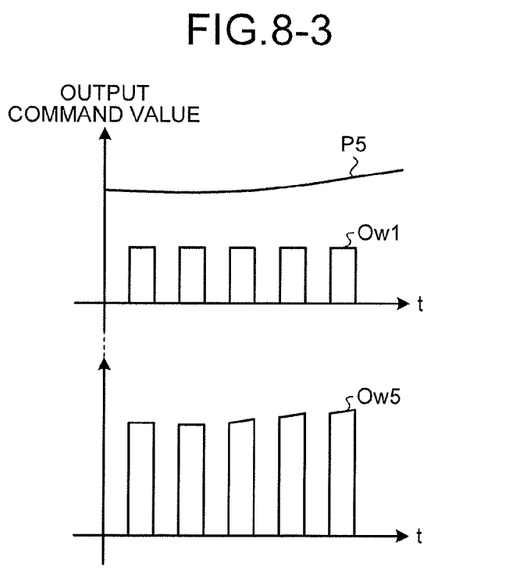

FIG. 8-1 to FIG. 8-3 depict the laser light output command values that are used when performing average value control. FIG. 8-1 depicts the average output command value that is used during the average value control. The average output command value shown in FIG. 8-1 is the average output command value Px that is loaded for the laser command value when average value control is performed, and it is the waveform when the laser output control device 11 performs the procedure at st8.

FIG. 8-2 depicts a relationship between the current command value and the average output command value after the feedback control. The current command value shown in FIG. 8-2 is the current command value P5 that has been adjusted so that the average monitored output value M3 becomes the same value as the average output command value Px, and it is the waveform when the laser output control device 11 performs the procedure at st9.

FIG. 8-3 depicts the current command pulse shape that is output to the laser power source when average value control is performed. The laser output control device 11 generates the current command pulse shape Ow5 by performing an AND operation on the current command value P5 and the output timing Ow1. Thus, the current command pulse shape Ow5 shown in FIG. 8-3 is the waveform when the laser output control device 11 performs the procedure at st10. The current command pulse shape Ow5 is output to the laser power source 13 by the laser output control device 11.

Thus, when performing peak value control, feedback control, which uses the monitored output value M1, is performed after the AND operation on the peak output value P1 and the output timing Ow1 is performed. Also, when performing average value control, an AND operation on the current command value P5 and the output timing Ow1 is performed after the feedback control, which uses the average monitored output value M3, is performed.

Although in the present embodiment, switching between peak value control and average value control is performed, on the basis of whether or not the ON pulse width W is greater than the predetermined value T, switching between peak value control and average value control may be performed using the ON pulse width W (the time at which the laser is oscillating) and an OFF pulse width $W_{off}$ (the time at which the laser is not oscillating) (a pulse interval).

In this case, the laser output control device 11 performs peak value control when the ON pulse width W is longer than the predetermined value T and also the OFF pulse width $W_{off}$ is longer than the predetermined value T. The pulse-width calculating section 42 calculates the ON pulse width W using the above-mentioned equation (1), and calculates the OFF pulse width $W_{off}$ using equation (3) as follows:

$$W_{off}=(1/f)\times(1-D) \quad (3)$$

The peak value control is a control that is performed on condition that the output waveform that has been detected by the power sensor 12 is able to follow the actual output of the laser light. Thus, since the actual output of the laser light may be a different waveform when the OFF pulse width $W_{off}$ is shorter than the predetermined value T, the laser output control device 11 performs the average value control in this case. Switching between peak value control and average value control using the ON pulse width W and the OFF pulse width $W_{off}$ stabilizes the laser light that is output by the laser oscillator 1, even when the OFF pulse width $W_{off}$ is short.

When the response time of the power sensor 12 differs depending on whether the peak is rising or falling, two types of the predetermined value T (T1 and T2) may be set, the predetermined value T being the reference time for switching between the ON pulse width W (the ON time of the pulse) and the OFF pulse width $W_{off}$ (the OFF time of the pulse). In this case, the laser output control device 11 performs peak value control when the ON pulse width W is longer than T1 and the OFF pulse width $W_{off}$ is longer than T2. Also, although the present embodiment has been described in terms of the laser output control device 11 and the laser oscillator 1 being configured separately, the laser output control device 11 may be integrated into the laser oscillator 1.

In addition, although the present embodiment has been described in terms of peak value control or average value control being performed using the average output command value Px, peak value control or average value control may be performed using the peak output value P1 (the command value).

In this case, the peak output value P1 is input to the laser output control device 11 from the laser output command section 2. In addition, when average value control is performed, the laser output control device 11 calculates the average output command value Px using the above-mentioned equation (2). In contrast, when peak value control is performed, the laser output control device 11 performs an AND operation on the peak output value P1 and the output timing Ow1 using the peak output value P1 from the laser output command section 2, and thus generates the output command pulse shape Ow2.

High-frequency laser lights are often used to reduce the thermal effect on surrounding parts by reducing the average heat input, so that it is sufficient to control the average laser energy. Thus, the laser output control device 11 controls the average value output when the output cycle of the laser light is of a high frequency, and it controls the peak value output when the output cycle of the laser light is of a low frequency. Hence, improvement can be observed in the follow-up properties of the output in low frequencies.

Thus, the embodiment allows control of the output of the laser light using a single power sensor 12, regardless of the frequency of the laser output command because the laser oscillator 1 is switched to either average value control or peak value control on the basis of the ON pulse width W that has been calculated from the laser output command value. This eliminates the need for an expensive power sensor to monitor the output because the laser light power monitor need not be configured to provide a speed higher than is necessary. The laser output can therefore be controlled as appropriate according to the characteristics of the power sensor 12.

Also, a simple device configuration is achieved due to a lack of need for a circuit, for example, to simulate the output value of the laser light. Hence, the output of the laser light can be controlled using a simple configuration and with ease.

INDUSTRIAL APPLICABILITY

As described above, the laser output control device, the laser oscillator, and the laser output control method according to the present invention are suitable for controlling the output of laser lights.

REFERENCE SIGNS LIST

1 laser oscillator
2 laser output command section
11 laser output control device
12 power sensor
13 laser power source
14 resonator
20 machining control device
41 output timing generating section
42 pulse-width calculating section
43 switching section
44 peak output value calculating section
45 output pulse generating section
46, 47 feedback control section
48 current pulse generating section
100 laser machining tool

The invention claimed is:

1. A laser output control device controlling a laser oscillator that outputs a laser light, comprising:
    a pulse-width calculating section calculating a pulse width during which the laser light is laser-oscillating on a basis of a laser output command used when generating an output waveform of the laser light;
    a switching section switching, on a basis of a size of the pulse width, to either one of peak value control, in which control is performed using a peak value of a pulse shape, and average value control, in which control is performed using an average value of the pulse shape, for calculating a current command value used for controlling the laser oscillator;
    a peak value command generating section generating, on a basis of an output value of the laser light output from the laser oscillator, the current command value using the peak value of the pulse shape to set the output value to become a value that corresponds to the laser output command, when performing the peak value control on the laser oscillator; and
    an average value command generating section generating, on the basis of an output value of the laser light output from the laser oscillator, the current command value using the average value of the pulse shape to set the output value to become a value that corresponds to the laser output command when performing the average value control on the laser oscillator, wherein
    the output value of the laser light is input to the peak value command generating section and the average value command generating section.

2. The laser output control device according to claim 1, wherein
    the pulse-width calculating section further calculates, on the basis of the laser output command, a pulse interval, the pulse interval being time during which the laser light is not laser-oscillating, and
    the switching section switches, on the basis of the size of the pulse width and a size of the pulse interval, to either one of the peak value control and the average value control.

3. The laser output control device according to claim 2, wherein the switching section
    switches to the peak value control when the pulse width is longer than a first set time and the pulse interval is longer than a second set time,
    switches to the average value control when the pulse width is equal to or less than the first set time and the pulse interval is longer than the second set time,
    switches to the average value control when the pulse width is longer than the first set time and the pulse interval is equal to or less than the second set time, and
    switches to the average value control when the pulse width is equal to or less than the first set time and the pulse interval is equal to or less than the second set time.

4. The laser output control device according to claim 1, wherein
    the switching section switches to the peak value control when the pulse width is longer than a first set time, and switches to the average value control when the pulse width is equal to or less than the first set time.

5. A laser oscillator outputting a laser light, comprising:
    a laser output control device controlling output of the laser light by outputting a current command value;
    a power source section generating, on a basis of the current command value, a current used for outputting the laser light;
    a resonator outputting the laser light using the current generated by the power source section; and
    a measuring section measuring an output value of the laser light, wherein
    the laser output control device includes
    a pulse-width calculating section calculating a pulse width during which the laser light is laser-oscillating on a basis of a laser output command used when generating an output waveform of the laser light,
    a switching section switching, on a basis of a size of the pulse width, to either one of peak value control, in which control is performed using a peak value of a pulse shape, and average value control in which control is performed using an average value of the pulse shape, for calculating the current command value used for controlling the laser oscillator,
    a peak value command generating section generating, on a basis of the output value of the laser light output from the resonator, the current command value using the peak value of the pulse shape to set the output value to become a value that corresponds to the laser output command when performing the peak value control on the resonator, and an average value command generating section generating, on the basis of the output value of the laser light output from the resonator, the current command value using the average value of the pulse shape to set the output value to become a value that corresponds to the laser output command when performing the average value control on the resonator, wherein the output value of the laser light measured by the measuring section is input to the peak value command generating section and the average value command generating section.

6. A laser output control method for controlling a laser oscillator that outputs a laser light, comprising:

a pulse-width calculation step of calculating a pulse width during which the laser light is laser-oscillating on a basis of a laser output command used when generating an output waveform of the laser light;

a switching step of switching, on a basis of a size of the pulse width, to either one of peak value control, in which control is performed using a peak value of a pulse shape, and average value control, in which control is performed using an average value of the pulse shape, for calculating a current command value used for controlling the laser oscillator;

a peak value command generating step of generating, on a basis of an output value of the laser light output from the laser oscillator, the current command value using the peak value of the pulse shape to set the output value to become a value that corresponds to the laser output command when performing the peak value control on the laser oscillator; and an average value command generating step of generating, on the basis of an output value of the laser light output from the laser oscillator, a current command value using the average value of the pulse shape to set the output value to become a value that corresponds to the laser output command when performing the average value control on the laser oscillator, wherein both when the peak value control is performed and when the average value control is performed, the output value of the laser light is input.

\* \* \* \* \*